Dec. 29, 1942.     E. C. WENTE     2,306,852
VIBRATION DAMPING MEANS FOR ROTATING MEMBERS
Filed Sept. 14, 1939     2 Sheets-Sheet 1

INVENTOR
E.C.WENTE
BY
G.H. Heydt
ATTORNEY

Dec. 29, 1942.  E. C. WENTE  2,306,852
VIBRATION DAMPING MEANS FOR ROTATING MEMBERS
Filed Sept. 14, 1939  2 Sheets—Sheet 2
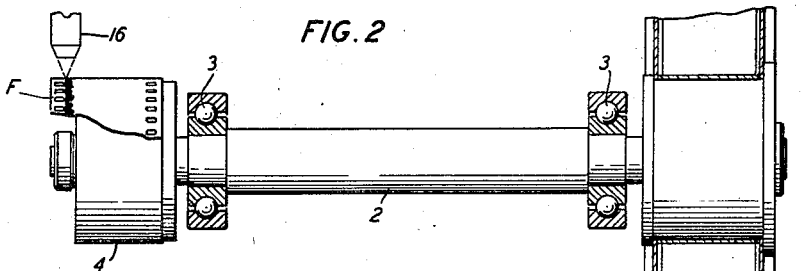
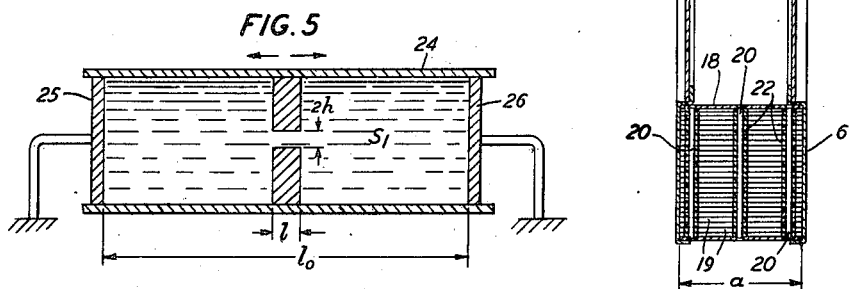
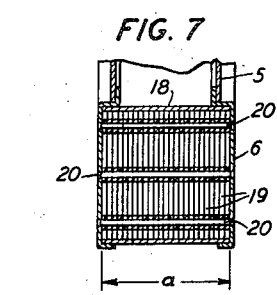
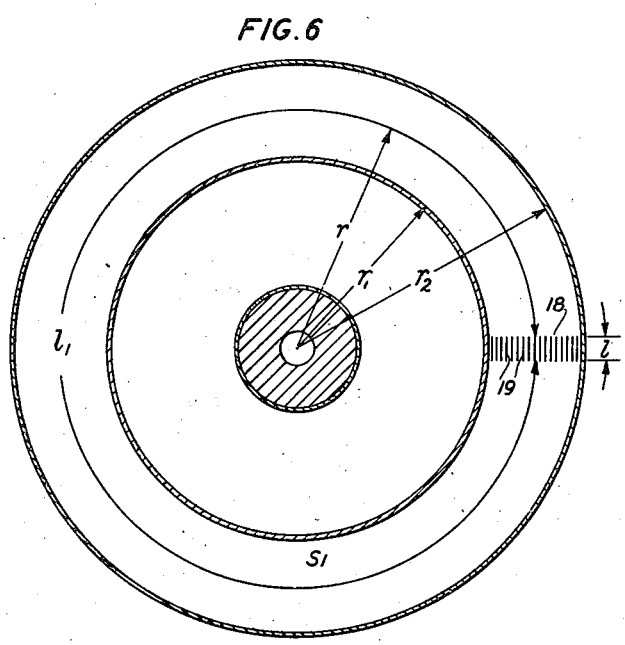
INVENTOR
E.C. WENTE
BY G. H. Heydt
ATTORNEY Patented Dec. 29, 1942

2,306,852

UNITED STATES PATENT OFFICE 2,306,852

VIBRATION DAMPING MEANS FOR ROTATING MEMBERS

Edward C. Wente, New York, N. Y., assignor to Bell Telephone Laboratories, Incorporated, New York, N. Y., a corporation of New York Application September 14, 1939, Serial No. 294,855

4 Claims. (Cl. 74—574)

This invention relates to improvements in vibration damping devices for rotating members.

The object of the invention is to provide an inexpensive and readily assembled vibration damping unit which may be employed in sound film propelling mechanism to effectively suppress all oscillations in the driven film likely to produce detectable distortion in the sound recorded thereon or reproduced therefrom.

A further object of the invention is to provide an inertia control member of the double mass inertia type in which changes in the relative velocities of the two inertia masses will occur at all amplitudes of low frequency disturbances likely to be applied to the control member and to insure frictional torque between the two masses exactly proportional to the relative velocities thereof.

Another object of the invention is to provide an inertia control member of the double mass inertia type incorporating novel means for coupling the inertia of the two masses.

A feature of the invention resides in the provision of a driven drum having a hollow rim portion completely filled with a heavy fluid constituting an inertia element and a baffle or series of baffles secured to and movable with said drum and immersed in the fluid to interact therewith to provide mass reactance and damping resistance elements of a filter termination capable of suppressing resonant oscillation of the device as a whole.

When a driven film engages and produces rotation of a supporting drum and coupled inertia mass, the inertia mass, if a simple fly-wheel, operates to suppress oscillations transmitted to the film by the film driving means. While this type driving means will operate to effectively suppress relatively high frequency oscillations, it not only is ineffective to suppress oscillations at the resonance frequency determined by the fly-wheel inertia and the film loop stiffness, but it will act to amplify these low frequency disturbances greatly.

It is highly important in sound film recording and reproducing systems that low frequency disturbances or oscillations be suppressed, as the sensitivity of the human ear is such that many low frequency modulations of sound frequencies within the audible range can be readily detected. It is therefore essential that the tendency of vibration damping systems of the type described to amplify these low frequencies be minimized. Low frequency disturbances likely to produce distortion in the recorded sounds may result from velocity variations arising in the drive side of the film driving system and include velocity variations due to driving gear tooth variations, sprocket tooth pitch variations, film perforation pitch variations and motor speed variations. Also, these low frequency disturbances may result from torque variations in the load side of the system and include the torque variations due to variations in the drum shaft ball bearing friction, unbalance in the rotating mass and transverse waves in the film stock. Although these variations in the load side of the system are torque variations acting on the damping unit or filter, they produce a velocity variation at the drum.

In the film driving mechanism proposed heretofore, suppression or damping of these low frequency disturbances is obtained by providing a filter termination in the form of a freely rotatable fly-wheel coupled to the drum through a viscous fluid. Low frequency disturbances produce rotation of the drum with respect to the fly-wheel in the fluid. The fly-wheel offers an impedance to the applied low frequency variations and thereby prevents resonant oscillation of the inertia control member. This impedance comprises the mass or inductive reactance of the fly-wheel and the frictional resistance of the fluid interconnecting the drum and fly-wheel. The film driving mechanism described usually assumes the form of a fluid-filled shell rigidly secured to the film driven drum shaft and a fly-wheel mounted on this shaft by means of ball bearings in the fluid-filled shell.

To obtain most efficient damping by means of a damping unit of this type, three conditions must be satisfied. First, relative rotation between the drum and fly-wheel should occur for the lowest possible amplitude of low frequency disturbance so that the frictional torque will be exactly proportional to the relative velocities thereof. Second, the mass of the rotatable fly-wheel should be several times larger than the mass of the film driven roller and drum, and, third, the magnitudes of resistance and mass reactance in the filter termination should be in the proper relation with the resistance predominating over the mass reactance at the resonance frequency of the drum and fly-wheel to obtain proper damping at resonance.

In a damping unit of the type in which a freely rotatable fly-wheel is mounted on ball bearings within the oil-filled shell, there is a certain amount of static friction between the balls, ball races and ball separators when the shell and fly-wheel are running at the same uniform speed. This static friction must be overcome before the outer shell can move relative to the free fly-wheel in response to a low frequency disturbance to produce damping thereof. Due to the presence of this static friction in the ball bearing, the condition wherein the frictional torque is exactly proportional to the relative velocities is difficult to obtain. Further, it is essential that the fly-wheel and inner surfaces of the shell be symmetrical about the axis of rotation to produce balance in the damping unit for all angular positions of the fly-wheel relative to the shell. Symmetry of form and symmetrical location of the shell and fly-wheel about the axis of rotation is extremely difficult to obtain.

In accordance with applicant's invention there is provided an inexpensive, readily assembled damping unit of the double mass inertia type incorporating a minimum number of parts and in which the frictional torque between the moving members is exactly proportional to their relative velocities for all amplitudes of low frequency disturbance. Further, in accordance with this invention there is provided a novel means for coupling the inertia of the two members by means of which the impedance of the second member may be readily controlled to produce damping of resonant oscillations. More specifically, there is provided a drum-shaped element having a hollow rim portion completely filled with a heavy fluid constituting an inertia element, the frictional connection between the two elements being amplified by means in the form of a narrow baffle having substantially purely resistive openings immersed in the fluid and secured to and movable with the rim portion of the drum. The interaction of the fluid and the baffle during relative rotation of the drum and fluid, provides the filter termination having resistive and reactive components in the proportions necessary to produce effective damping of resonant oscillations. In an inertia control member, in accordance with this invention, the optimum resistive component of a filter termination may be readily obtained without materially increasing the reactive component by a proper design of the length of the baffle, the size, shape and number of the orifices in the baffle and the density and coefficient of viscosity of the fluid.

Vibration damping units for rotating shafts have been developed heretofore in which the damping unit comprises a drum having a hollow rim portion filled with a fluid and being in some cases provided with a plurality of parallel vanes extending completely around the drum and secured thereto in the hollow rim portion thereof. These units, while effective for damping relatively high frequency oscillations in a shaft, cannot be used to advantage in systems wherein it is essential that the tendency of the unit to oscillate at resonant low frequencies be effectively suppressed. This is due to the fact that the proper resistive component of the filter termination for resonant damping cannot be obtained without correspondingly increasing the reactive component thereof. When a rigid plate in contact with a fluid is given an alternating motion in a direction parallel to the plane of the plate, some of the energy of motion will be translated into heat by virtue of the viscosity of the fluid. At the same time, some of the fluid, in particular that which is near the surface, will be dragged back and forth with the plate. The former action imposes a mechanical resistance, and the latter a mass reactance on the plate. While it is possible to raise or lower these impedances by adjustment of the viscosity or density of the fluid, they cannot be varied independently. It has been shown in treatises in hydrodynamics that they always remain equal to each other. This restriction makes it impossible to get proper adjustment of the impedance elements of the filter in a damping unit of this construction. A further difficulty lies in the fact that, since some of the fluid is carried along with the shell, the shell mass is effectively increased and the fluid mass correspondingly decreased. This situation enhances the problem of maintaining the condition that the mass of the fluid shall be several times that of the shell. This is particularly true in that form of construction in which there is a plurality of vanes.

In another form of damping unit employing a fluid in the hollow rim of a drum, partitions having one or more apertures are secured transversely in the angular channel which impede the free peripheral flow of the fluid, and so act as a coupling means between the fluid and the drum. These damping units are effective in keeping oscillations from reaching large amplitudes and so have been usefully applied to synchronous motors for preventing excessive hunting. However, careful measurements on such units have shown that, while they successfully damp oscillations of relatively large amplitude, they are entirely ineffective when the oscillations are small. When the oscillations are of large amplitude, the stream velocity of the fluid through the apertures in the partitions reaches a value at which the flow is no longer lamellar, but is broken up into eddies. When this condition is reached, a relatively large amount of mechanical energy is translated into heat and the oscillations are damped. At low amplitudes where the flow is still lamellar, there is an inappreciable amount of this conversion. Such devices have, therefore, been ineffective as a means for damping oscillations of small amplitude.

Applicant has now discovered that by a novel design for the openings in the partitions in relation to the viscosity and moments of inertia of the fluid and the shell, proper damping may be obtained even for small amplitudes, that is, when the flow is still lamellar. Applicant has devised a structure in which these relationships are satisfied. If a device of this general character is to be effective in damping small oscillations, the following conditions must be met: The resistance component of the impedance which any one of the openings in the partitions offers to the flow of the fluid must be large compared with the mass reactance for frequencies at which the device is to act as a damper of oscillations; the number of such openings in the partitions must be so determined that the total resistance of all of them taken together shall be of the required magnitude in relation to the number of partitions and to the moments of inertia of the shell and the fluid; the moment of inertia of the fluid must be several times the moment of inertia of the shell.

The first of these conditions can be satisfied if each of the openings in the partitions is made sufficiently small or if a fluid is chosen having a relatively large value, of $\mu/\rho$, where $\mu$ is the viscosity and $\rho$ the density of the fluid. There are, however, difficulties connected with the use of a fluid having a high value of $\mu/\rho$. If the density is low, a large volume of fluid is required for obtaining the desired amount of moment of inertia in the fluid. Not only will the device be bulky under these circumstances, but practical difficulties will be met in trying to design a shell which has enough strength and at the same time the required low value of moment of inertia. The use of a fluid of high viscosity also involves practical difficulties. The higher the viscosity, the greater the proportion of the fluid that is carried with the shell. Moreover, most liquids of high viscosity have a relatively low density, whereas liquids having the desired high densities, such as mercury or some of the heavier organic fluids, have a relatively low viscosity. There remains then the practical necessity of designing openings in the partitions of sufficiently small dimensions so that their resistance shall be several times their mass reactance at the frequencies at which oscillations are to be suppressed and for a fluid of relatively high density and low viscosity.

The partitions will, in general, have to be provided with a large number of such openings so that the resistance of all of them taken together shall have the required value. In order also that there may be no pockets of inactive fluid, which would, in effect, increase the moment of inertia of the shell and decrease that of the fluid, the openings should cover the greater part of the partitions. All these conditions are readily met in applicant's device.

The invention will best be understood from the following description of a specific embodiment, when read in connection with the accompanying drawings, in which:

Fig. 2 is a side elevation, partly in section, of the inertia control device shown in Fig. 1;

Fig. 5 is a diagrammatic showing of a rectangular fluid-filled shell containing a baffle having a single orifice;

Fig. 6 is a diagrammatic showing of the inertia control device of Fig. 1; and

Fig. 7 is a showing of an alternative form of baffle.

Figure 1:
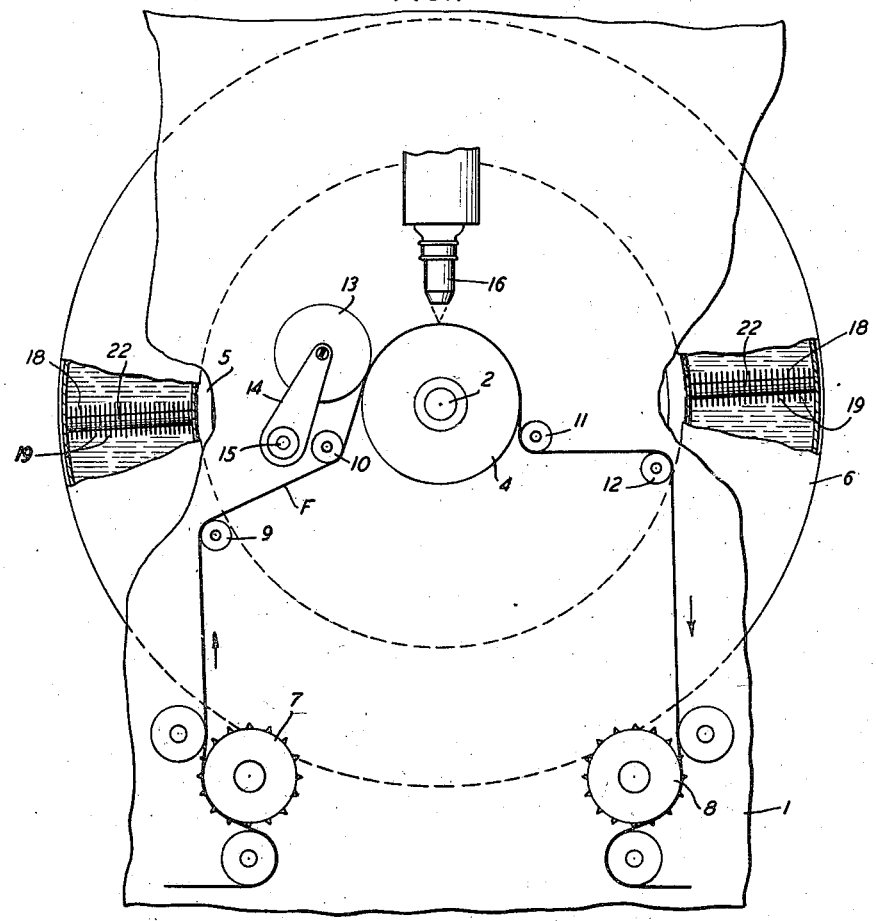
Fig. 1 is a front elevation, partly in section, of a film driving mechanism and associated inertia control device in accordance with the invention.

Referring to Fig. 1, numeral 1 designates a vertical side wall of a film recording or reproducing apparatus. A shaft 2 is rotatably mounted in wall 1 by means of ball bearings 3 (Fig. 2). A roller 4 is secured to one end of shaft 2. Secured to the opposite end of the shaft is a drum 5 provided with a hollow rim portion 6. A film F is drawn from a feed reel and fed to roller 4 by means of a driving sprocket 7 and is drawn from the roller 4 and fed to a take-up reel by a driving sprocket 8. The driven film F between the sprockets engages and produces rotation of roller 4, shaft 2 and drum 5. Suitable rollers 9, 10, 11 and 12 guide the film to and from the roller 2.

A roller 13 is rotatably mounted in arm 14, which arm is pivoted at 15 and tensioned by spring means (not shown) toward roller 4. Roller 13 engages the film on roller 4 to prevent slippage of the film on this roller.

A lens unit 16 forms part of an optical system for projecting a sound modulated recording light beam or a constant intensity reproducing light beam to the film on the roller 4.

In accordance with the invention, the hollow rim portion 6 of drum 5 is completely filled with a fluid. This fluid constitutes an inertia mass in the rim portion, which is rotatable with respect to drum 5. Means are provided for frictionally coupling the drum 5 and the fluid mass to produce in the fluid, resistance and mass reactance components of a filter termination to suppress resonant oscillations of the roller 4 and drum 5 produced by low frequency disturbances resulting from velocity variations arising in the drive side of the driving system or disturbances resulting from torque variations in the load side of the system.

The means provided for coupling the drum 5 and the fluid mass takes the form of one or a plurality of narrow baffles 18 disposed in the hollow rim portion 6 of drum 5 in the path of the fluid mass. The baffles 18, each presenting a plurality of rectangular apertures having a width $W$, length $l$ and height $2h$, represent a preferred form, but other forms, such as baffles containing one or a plurality of circular orifices or tubes, as shown in Fig. 8, may be used within the scope of this invention. As shown in Fig. 7 the rectangular apertures in baffle 18 may be disposed with their longer axis extending radially of the drum as distinguished from the baffle in Figs. 1 and 2 wherein the longer axis of the rectangular apertures extend axially of the drum.

While, theoretically, one baffle only is necessary, the use of two diametrically opposed baffles gives a symmetrical structure and is preferred as by this means the drum 5 will be maintained in balance. However, balance may be approached when one baffle is used by the use of a counterweight.

Figure 4:
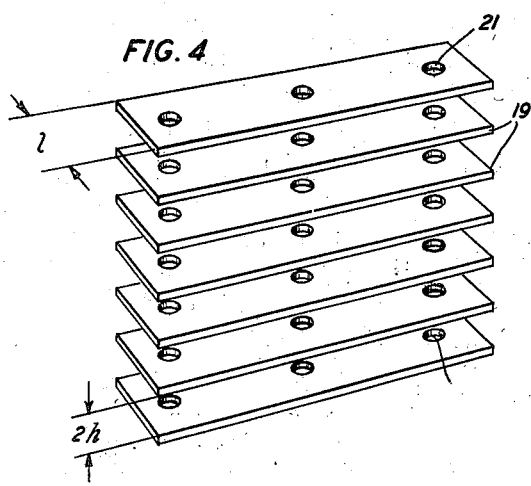
Fig. 4 is an enlarged view in perspective of a preferred form of baffle.

The baffles as shown in the preferred form, comprise a plurality of thin rectangular strips 19, of solid material, spaced from one another in a direction radially of drum 5 and rigidly secured thereto in the rim portion 6. A plurality of rods 20 extend through holes 21 (Fig. 4) in the rectangular strips 19. These rectangular strips may be secured to the rods 20 by any suitable means, such as solder, or they may be maintained in spaced relation by means of a plurality of shims 22, as shown in the drawings. The rods 20 have their ends rigidly secured to drum 5 by any suitable means insuring against fluid leakage from the rim portion of the drum.

In the damping unit in accordance with this invention, a disturbance applied to the damping unit including the roller 4 and drum 5 will cause it to move relative to the fluid mass and this fluid mass will offer an impedance to this motion in addition to the mass reactance of the drum itself. The impedance offered by the fluid will be partly resistive and partly reactive. The relative magnitude of these components will depend on the frequency of the applied disturbance, the orifice area, the total shell area $S_1$, the baffle length $l$, the density $\rho$ of the fluid and the coefficient of viscosity of the fluid $\mu$.

Applicant has developed separate formulae for the resistive and reactive components of the filter termination expressed in terms of the dimensions and constants of the system. In developing these formulae applicant will first discuss the problem of viscous flow through long narrow slits. Consider the flow of a viscous fluid through a 1 cm. ($W=1$) slit shown in Fig. 3. The direction of the velocity is normal to the plane of the orifice. Let the height $2h$ be so small that the flow of a fluid in the direction indicated by the arrow is determined mainly by viscosity. Let $p_1$ and $p_2$ be the pressures at the two ends of the slit, the length of which is equal to $l$, and assume $p_1$ greater than $p_2$. Let $p$ be the pressure in the slit at a distance $x$ from the end where the pressure is $p_1$. We then have $$V = -\frac{2h^3}{3\mu}\frac{dp}{dx}$$

where $V$ is the volume velocity, $\mu$ the viscosity of the fluid.

$$\frac{dp}{dx}$$

is constant along the length of the slit and is, therefore, equal to $$-\frac{p_1-p_2}{l}$$

The mechanical resistance of the slit is equal to $$\frac{\text{Force}}{\text{linear velocity}}$$

and may be expressed by the following equations $$R = \frac{(p_1-p_2)2h}{\frac{V}{2h}}$$

$$= \frac{p_1-p_2}{V} \cdot 4h^2$$

$$= \frac{3\mu l}{2h^3} \cdot 4h^2$$

$$= \frac{6\mu l}{h} \quad (1)$$

For a given slit and fluid, the mass reactance will exceed the resistance if the frequency is sufficiently high. At high frequencies the flow is controlled by the mass of the fluid. The flow across the section of the slot at high frequencies will be $$m = 2\rho h l$$

where $\rho$ is the density of the fluid. The mass reactance will then be $$2\rho h l \omega \quad (2)$$

where $\omega$ is $2\pi$ times the frequency. It can be shown that at even the very lowest frequencies the mass reactance does not exceed that given by (2) by more than 20 per cent.

In the problem with which we are concerned, we wish to have the resistance predominate over the mass rectance in this slit. Hence, we must have $$\frac{6\mu l}{h} > 2\rho h l \omega$$

or $$h < \sqrt{\frac{3\mu}{\rho\omega}} \quad (3)$$

in the frequency region where it is desired to damp oscillations.

It is of interest to see that values $h$ should take in a practical case. Mercury has been the fluid generally used in damping units of the double inertia type, in which one of the inertia elements is a fluid. For mercury $\rho/\mu$ is about 1,000. In film driven sound rollers $\omega$ may be about 3. If it is assumed that the resistance at this value of $\omega$ should be five times the mass reactance, Formula 3 gives for $h$ the extremely small value of .035 centimeter.

In treatises on hydrodynamics, it is shown that the mass of fluid effectively carried along with a plate immersed in the fluid and vibrating in its own plane is $$\sqrt{\frac{\rho\mu}{2\omega}}$$

In the case of a damping unit of the form here considered this quantity, when multiplied by the area of the surface of the shell in contact with the fluid, must be added to the mass of the shell itself and subtracted from the fluid in the determination of the ratio of the moment of inertia of the fluid to that of the shell. For practical reasons this quantity should be kept low.

Figure 3:
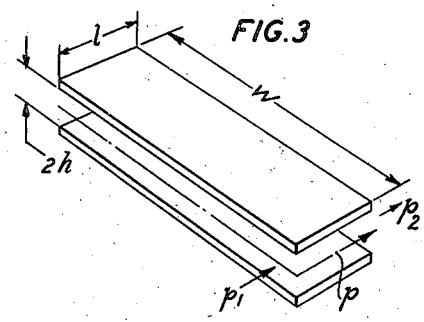
Fig. 3 is an enlarged view in perspective of a single orifice.

In Fig. 5 numeral 24 represents a movable massless tube of cross-section $S_1$ provided with a baffle as shown in Fig. 3 having an aperture of height $2h$, width $W$ and length $l$. Here the length of fluid-filled tube, exclusive of baffle, is $l_1$ and equals $l_0-l$. Numerals 25 and 26 represent fixed pistons. The tube may be moved in opposite directions with respect to the fixed pistons 25 and 26, as indicated by the arrows.

When a force is applied to the tube in the direction indicated by the arrows, it will meet with mechanical impedance $$Z_1 = WZ\frac{S_1^2}{(2hW)^2}$$

where $Z$ is the mechanical impedance of the slit per unit width and $W$ is the width of the slit, and provided the effect of adhesion of the fluid to the walls of the tube is neglected.

If instead of this single slit aperture, there are $n$ such slits, the impedance $Z_1$ will be $$Z_1 = nWZ\frac{S_1^2}{(2hWn)^2} \quad (5)$$

If the frequency satisfies the condition expressed in Equation 3, the mass reactance $m\omega$ of the slit is negligible and may be disregarded. The impedance $Z$ of the slit then becomes purely the resistance $R$ of the slit, as expressed in Equation 1, and the impedance $Z_1$ of the tube may be expressed as the resistance $R_1$. Therefore from Equation 5

$$R_1 = \frac{6\mu l S_1^2}{4h^3 W n} \quad (6)$$

If the pistons were not fixed and the apertures in the baffle were closed, the impedance would merely be the mass reactance of the fluid, i. e., $M\omega = \rho S_1 l_1 \omega$.

If the pistons are free to move and the apertures not closed, the resultant impedance will be $$Z = \frac{M\omega R_1}{\sqrt{R_1^2 + M^2\omega^2}}$$

If, now, the tube itself has a mass reactance, $m\omega$, it must be vectorially added to this impedance, giving as the total impedance $$Z_T = \sqrt{\frac{m^2 M^2 \omega^2 + R_1^2(M+m)^2}{R_1^2 + \omega^2 M^2}}\,\omega \quad . \quad . \quad . \quad (7)$$

The straight shell of Fig. 5 may be regarded as the limiting case of a wheel as shown in Fig. 6 when the diameter increases indefinitely. The impedance expression (7) would, therefore, apply to this limiting case. This can also be shown to be a good approximation for cases where the mean diameter $r_1+r_2$ is considerably larger than $r_2-r_1$. In case of a wheel the most convenient coordinate to use is its angular velocity rather than the linear velocity, since angular velocity is the same for all points on the wheel while the linear velocity varies with the radius of the point chosen. When angular velocity is taken as the coordinate, impedance must be replaced by moment of impedance $\bar{Z}_T$.

In this transformation $$l_0 = \pi(r_2 + r_1)$$
$$S_1 = a(r_2 - r_1)$$

where $a$ equals the width of fluid-filled channel.

In this system the moment of resistance is $$\bar{R}_1 = \frac{r_2^2 + r_1^2}{2} \left[ \frac{6\mu l S_1^2}{4h^3 W n} \right] \tag{8}$$

and the moment of reactance $\bar{M}$ $$\bar{M} = \frac{r_2^2 + r_1^2}{2} \cdot M$$

where $M$, the fluid mass, equals $\rho \pi a (r_2^2 - r_1^2)$.

$m$ must be replaced by $\bar{m}$, the moment of inertia of the drum or wheel and all rigidly coupled parts.

Equation 8 may be expressed in terms of the dimension $l$ as follows:

$$l = \frac{4\bar{R}_1 h^3 W n}{3\mu S_1^2 (e_1^2 + r_2^2)}$$

The total moment of impedance, corresponding to the value of $Z_T$ as given by (7), is $$\bar{Z}_T = \sqrt{\frac{\bar{M}^2 \bar{m}^2 \omega^2 + \bar{R}_1^2 (\bar{M} + \bar{m})^2}{\bar{R}_1^2 + \omega^2 \bar{M}^2}} \omega$$

A vibration damping unit of the type disclosed in which a filter termination is employed in the form of a mass rotatable with respect to but frictionally coupled to the film driven drum, may be said to have an optimum terminating resistance when it behaves nearly like an aperiodic system. In general, the optimum resistance for a filter termination which will effectively suppress the tendency of the vibration damping unit to amplify resonant low frequency disturbances may be determined by a known formula expressed in terms of the moment of inertia $\bar{m}$ of the roller 4 and drum 5, the moment of inertia $\bar{M}$ of the frictionally coupled mass and the moment of stiffness $\bar{k}$ of the film. It has been found desirable when using the vibration damping device in film propelling apparatus of the type disclosed to have the ratio of the moment of inertia $\bar{m}$ of the fluid mass and the $M$ of the drum at least 2, with a fluid having a $\rho/\mu$ at least 50 and in which the plurality of equal apertures, whose size is determined by the formula given herein, occupy at least 75 per cent of the total area of the baffle.

The moment of inertia or size of the damping unit to be selected for any particular application is determined in large measure by the same well known laws that govern the selection of a flywheel, with this restriction: the unit must be so proportioned that the moment of inertia of the fluid will be several times that of the shell. After these dimensions have been set, the optimum resistance is determined by known formulae, previously developed by those skilled in this art. By means of this invention, this can readily be obtained for the damping unit disclosed herein by a proper selection of the dimensions and number of apertures in the baffles.

The damping unit in accordance with this invention is of simple construction incorporating a minimum number of parts which may be readily assembled to provide a damping unit in which the relative rotation between the drum and rotatable mass will occur for the lowest possible amplitude of low frequency disturbance, thereby producing a frictional torque exactly proportional to the relative velocities of the drum and mass. Further, the baffle adds negligible mass to the drum 5 and does not alter appreciably the selected ratio between the mass of the shell and the mass of the fluid fly-wheel.

Although described in connection with a film driven system, this type of damping unit may be used to advantage in place of a conventional fly-wheel when and wherever the suppression of oscillations becomes important.

What is claimed is:

1. A vibration damping device for a rotating shaft comprising a drum coupled to said shaft and having a hollow rim portion containing a fluid, and means coupling said drum to said fluid, said means comprising a plurality of rectangular members spaced from one another in a direction radially of said drum in the hollow rim portion thereof and secured thereto with their longer sides extending axially thereof.

2. A vibration damping device for a rotating shaft comprising a drum fixed to said shaft and having a hollow rim portion, a fluid rotatable in the hollow rim portion of said drum, a plurality of rectangular members having their longer sides extending across the hollow rim portion of said drum axially thereof and spaced from one another in a direction radially of said drum, and means securing said members to said drum.

3. A vibration damping device for a rotating shaft comprising a drum fixed to said shaft and having a hollow rim portion, a fluid rotatable in the hollow rim portion of said drum, a plurality of rectangular members having their longer sides extending across the hollow rim portion of said drum radially thereof and spaced from one another in a direction axially of said drum, and means securing said members to said drum.

4. A vibration damping device for a rotating shaft comprising a drum fixed to said shaft and having a hollow rim portion the axial dimension of which is small compared to the circumferential length thereof, a fluid mass in said rim portion, a plurality of rectangular members disposed in spaced relation in said hollow rim portion with their shorter sides extending peripherally of said drum and means securing said members to said drum.

EDWARD C. WENTE.